March 3, 1959 R. LUCIEN 2,875,861
VIBRATION DAMPER
Filed March 17, 1954 2 Sheets-Sheet 1
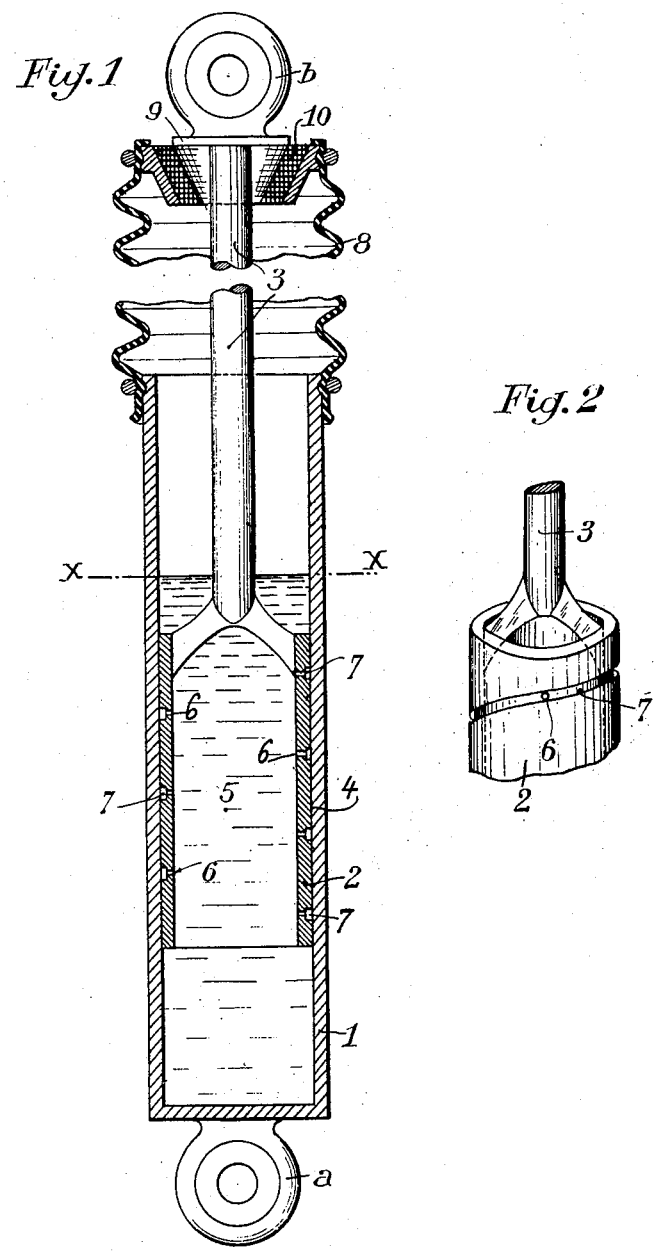

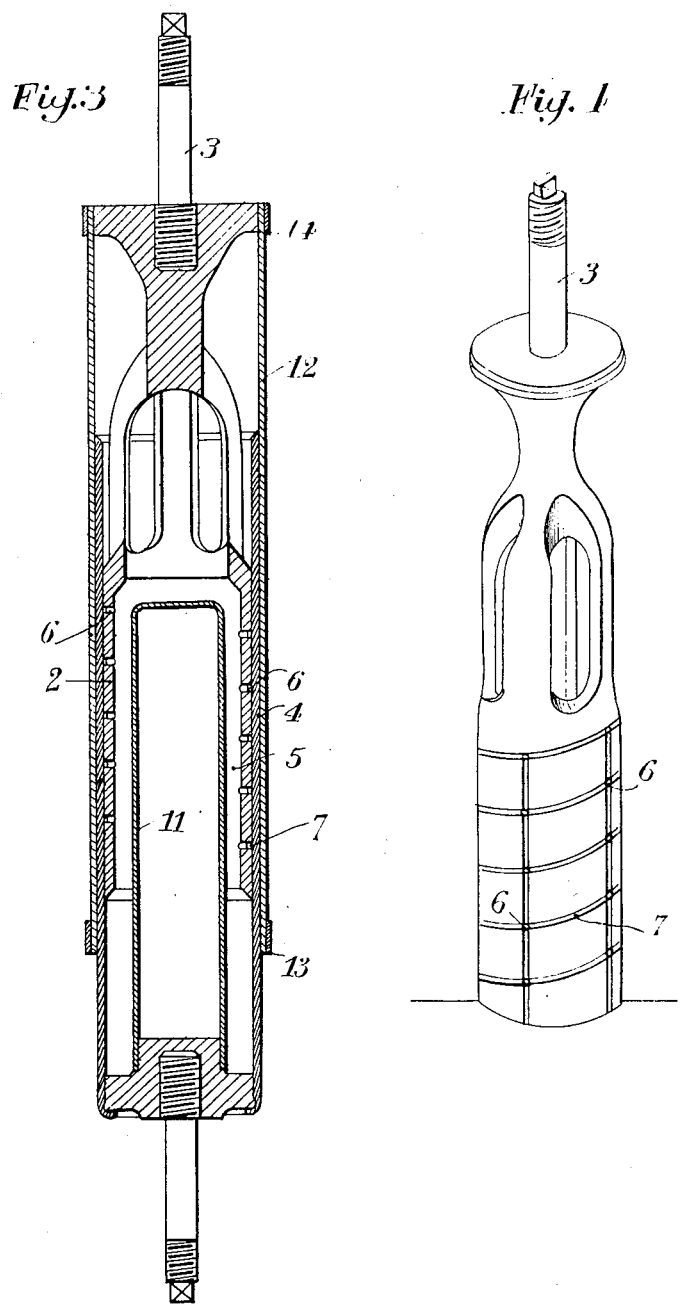

United States Patent Office 2,875,861
Patented Mar. 3, 1959

2,875,861
VIBRATION DAMPER

René Lucien, Paris, France, assignor to Societe d'Inventions Aeronautiques et Mecaniques S. I. A. M., Fribourg, Switzerland, a corporation of Switzerland Application March 17, 1954, Serial No. 416,842

Claims priority, application France November 18, 1953

1 Claim. (Cl. 188—88)

The present invention has for its object a method and a device for damping the relative oscillation of two systems parallel to an axis.

In its main principles, the method is characterised by the fact that it takes advantage of the viscosity forces developed inside an oil in the form of a thin, stable and continuous film, interposed between two very closely adjacent surfaces, co-axial with the said axis and respectively rigidly coupled to each of the said systems.

The shock-absorber device in accordance with the invention is constituted essentially by a cylindrical body in which is adapted to move, parallel to the axis of the oscillations to be damped, a sliding sleeve separated from the said body by an extremely small annular clearance of the order of a few hundredths of a millimeter. The said annular space is filled with oil in the form of a very thin film, the oil having a viscosity within the range of 1,000 and 30,000 centistokes approximately.

In accordance with an important feature of the invention, in order to ensure the continuity and the stability of this film of oil, the latter is constantly re-supplied from a reserve of oil which, contained in the sliding sleeve and in the body of the shock-absorber communicates with the said space by means of orifices passing through the sleeve and leading into one or a number of grooves formed on the exterior surface of the latter.

In practice, there may be utilised for the purposes of the invention, castor oils or mineral or vegetable oils, to which dope may be added if necessary, in order to obtain a suitable index of viscosity, siliconed oils, etc.

When the vibrations in a direction parallel to the axis are initiated between the two systems to be damped, they are transmitted to the cylindrical body connected to the first system and to the sliding sleeve connected to the second system. Being that the sliding sleeve is open at both ends, the fluid contained inside the cylindrical body passes freely through the sleeve. The fluid is not pressurized as would be the case in all conventional telescopic shock absorbers, and there is no forced path of flow for the fluid through any restricted passage whatsoever. At all times the fluid remains at atmospheric pressure.

In contradistinction the relative movement of the cylindrical body and sliding sleeve causes forces of viscosity in the thin film of fluid contained in the annular space between these two parts, these forces being in opposition to the relative movement. It is well known that forces of viscosity are developed over the whole surface of a moving part immersed in a fluid, and that they follow the classical line of thermo-dynamics as applied to the phenomenon of viscosity. In the particular case of the present invention, these forces and the vibration damping affect the resulting problem rather proportional to the coefficient of viscosity of the oil to the area of the cooperating surfaces and to their relative velocity, and they are inversely proportional to the thickness of the film oil.

The attached drawing shows a shock-absorber device having the characteristic features of the invention.

Fig. 1 is a view in axial cross-section;
Fig. 2 illustrates a detail, shown in perspective;
Fig. 3 is a view, in axial cross-section, of a shock-absorber constructed in accordance with a modification; and
Fig. 4 is a perspective view of the sliding sleeve of said shock-absorber in Fig. 3.

Inside the calibrated cylindrical body 1 of the shock-absorber, pivotally attached at $a$, for example to the non-suspended part of a vehicle, a sliding sleeve, 2, is adapted to move, which is carried by a rod 3 pivotally attached by a terminal ring $b$ to the suspended portion of the same vehicle. An annular space 4 of the order of a few hundredths of a millimeter—for example 0.02 to 0.06 mm.— is provided between the sliding sleeve and the cylinder. The latter is filled with a liquid 5 having a viscosity of the order of 1,000 to 30,000 centistokes up to a level $x$—$x$ which is, in principle, located above the level which the sleeve can reach during its maximum travel towards the top of the cylinder.

This liquid constantly supplies the said annular clearance 4 by virtue of the provision of feeding orifices 6, which pass through the sleeve and provide a communication between the liquid mass 5 and a spiral groove 7 which forms an oil groove out in the exterior surface of the sliding sleeve 2. The upper portion of the rod 3 is protected against mud, dust and foreign objects, by a bellows sheath 8, one extremity of which is fixed to an upper plate 9, the lower extremity being attached to the body of the apparatus. The unit may be completed with advantage by a filter 10.

In the embodiment of the invention shown onto Figures 3 and 4, the device is provided with a thin tube 11, which allows of reducing the volume of the liquid in the device.

Moreover, the bellows sheath is here formed with a rubber cylinder 12, secured at its bottom 13 by an adhesive and at the top by a rubber collar 14. The outer surface of sleeve 2 may be advantageously coated with a chromium deposit.

An apparatus according to the present invention has been built with the following dimensions:

Diameter of the cylindrical body—30 to 40 millimeters,
Length of the sliding sleeve—80 to 120 millimeters,
Viscosity of oil—29,000 centistokes,
Spring flexibility—0.15,
Load—400 kilograms.

It can be readily ascertained that a standard passenger vehicle having a spring suspension of this standard flexibility can be so equipped with a shock absorber, according to the present invention, that the shocks are completely absorbed and that the shock absorber is practically aperiodic.

What I claim is:

A vibration-damping device comprising a cylinder defining a reservoir for liquid, a wide hollow cylindrical sliding sleeve open at its ends to provide free flow of liquid therethrough and slidable within said cylinder, a rod directly connected to said sleeve and extending from said cylinder, a plate encircling said rod and defining an annular passage therewith, a filter in said annular passage, a bellows coupling said plate to said cylinder, said sliding sleeve being spaced from said cylinder by an annular clearance to define therebetween a space of film dimension, and a thin, continuous and stable film of viscous liquid in the annular clearance for providing drag on the relative motion between the cylinder and sleeve.

(References on following page)

References Cited in the file of this patent

UNITED STATES PATENTS

| | | |
|---|---|---|
| 1,949,288 | Wallace | Feb. 27, 1934 |
| 1,967,640 | Wallace | July 24, 1934 |
| 2,149,040 | Binder et al. | Feb. 28, 1939 |
| 2,168,679 | Myers | Aug. 8, 1939 |
| 2,252,771 | Katcher | Aug. 19, 1941 |
| 2,506,726 | Magrum | May 9, 1950 |
| 2,633,368 | Ross | Mar. 31, 1953 |
| 2,636,726 | Mercier | Apr. 28, 1953 |

FOREIGN PATENTS

| | | |
|---|---|---|
| 1,026,764 | France | Feb. 11, 1953 |
| 670,786 | Great Britain | Apr. 23, 1952 |